United States Patent [19]
Arai et al.

[11] 4,105,935
[45] Aug. 8, 1978

[54] MOTOR SPEED CONTROL APPARATUS

[75] Inventors: Kazuo Arai; Yoshiaki Igarashi, both of Neyagawa; Masaki Suzuki, Hirakata; Nobuya Sano, Ikoma; Toshikazu Yosumi, Hirakata, all of Japan

[73] Assignee: Matsushita Electric Industrial Co., Ltd., Kadoma, Japan

[21] Appl. No.: 733,023

[22] Filed: Oct. 15, 1976

[30] Foreign Application Priority Data

Oct. 22, 1975 [JP] Japan .................. 50-127819
Oct. 24, 1975 [JP] Japan .................. 50-128733

[51] Int. Cl.$^2$ ............................................ H02P 5/10
[52] U.S. Cl. .................................. 318/314; 318/318
[58] Field of Search ........... 318/327, 341, 318, 345 E, 318/314

[56] References Cited

U.S. PATENT DOCUMENTS

| 3,340,951 | 9/1967 | Vitt ............................ 318/314 |
| 3,493,834 | 2/1970 | Worrall ...................... 318/314 |
| 3,506,901 | 4/1970 | Prezzi et al. ............... 318/314 |
| 3,514,679 | 5/1970 | Larsen ....................... 318/314 |
| 3,657,624 | 4/1972 | Nagano ..................... 318/327 |

Primary Examiner—David Smith, Jr.
Attorney, Agent, or Firm—Wenderoth, Lind & Ponack

[57] ABSTRACT

A motor speed control apparatus has a frequency generator for generating a frequency signal the frequency of which is proportional to the motor speed; a first pulse generator for producing a first pulse train having the same period as that of the frequency signal, each pulse of the first pulse train having a pulse width which is shorter than the period of the frequency signal and decreases as the frequency of the frequency signal increases; a second pulse generator for producing a second pulse train, the leading edges of the pulses of the second pulse train coinciding in timing with those of the first pulse train, each pulse of the second pulse train having a constant pulse width nearly the same as that of each pulse of the first pulse train obtained by the motor rotation at a predetermined speed; and a subtractor for producing a third pulse train by the subtraction of the pulses of the first pulse train and the corresponding pulses of the second pulse train, whereby there is produced a motor torque in correspondence with the third pulse train, and the motor speed can be controlled with suppressed motor vibration and excellent torque-speed characteristics of the motor.

7 Claims, 6 Drawing Figures

FIG. 1 (PRIOR ART)

FIG.2 I 
FIG.2 II 
FIG.2 III 
FIG.2 IV 
FIG.2 V 
FIG.2 VI (PRIOR ART)

FIG.4 I 
FIG.4 II 
FIG.4 III 
FIG.4 IV 
FIG.4 V 
FIG.4 VI 
FIG.4 VII

MOTOR SPEED CONTROL APPARATUS

This invention relates to a motor speed control apparatus.

A known motor speed control apparatus comprises: a frequency generator for generating a frequency signal the frequency of which is proportional to the rotational speed of the motor; and a pulse generator for producing a pulse train having the same period as that of the frequency signal, each pulse of the pulse train having a pulse width which is shorter than the period of the frequency signal and decreases as the frequency of the frequency signal increases, whereby by applying to the motor a motor torque control signal in correspondence with the pulse train, the motor speed is controlled.

However, according to this known apparatus, when the motor speed exceeds a critical speed at which each pulse width becomes zero (overshooting), the motor cannot generate a braking torque electrically for decreasing its speed, so that the linearity is lost in such a motor speed control system, resulting in a long overshooting time. This undesirable long overshooting time can be substantially prevented by setting the pulse width of each pulse at the normal motor speed to be very long, so that the pulse width does not become zero even when the motor speed becomes very high within the probable motor speed range. However, when the pulse width is very long at the normal motor speed, ripple components always exist in the resultant torque control signal, so that motor vibration occurs.

It is an object of this invention to provide a motor speed control apparatus by which the motor speed can be controlled with a good linearity of the speed control system and with suppressed motor vibration.

This object is achieved according to this invention by providing a motor speed control apparatus comprising: frequency generating means coupled to the motor for generating a frequency signal the frequency of which is proportional to the rotational speed of the motor; and control signal generating means coupled to the frequency generating means for generating a control signal for controlling the motor torque, the control signal generating means comprising (a) first pulse generating means for generating, in dependence on the frequency signal, a first pulse train having a period the same as that of the frequency signal, each pulse of the first pulse train having a pulse width which is shorter than the period of the frequency signal and which decreases as the frequency of the frequency signal increases, (b) second pulse train generating means for generating, in dependence on the frequency signal, a second pulse train of pulses one edge of each of which coincides in timing with the corresponding edge of each pulse of the first pulse train, each pulse of the second pulse train having a constant pulse width nearly the same as that of each pulse of the first pulse train obtained by the motor rotation at a predetermined speed, and (c) subtraction means coupled to the first and second pulse generating means for producing a third pulse train of pulses each having a pulse width corresponding to the difference between the pulse width of each pulse of the first pulse train and the pulse width of each pulse of the second pulse train, whereby a motor torque corresponding to the third pulse train can be generated.

This and other objects and features of this invention will more readily be understood upon consideration of the following detailed description taken together with the accompanying drawings, in which:

FIGS. 2I–2VI are graphs of wave forms appearing at several points in the conventional apparatus of FIG. 1;

FIGS. 4I–4VII are graphs of wave forms appearing at several points in the apparatus of FIG. 3;

FIGS. 6I–6VIII are graphs of wave forms appearing at several points in the apparatus of FIG. 5.

Figure 1:
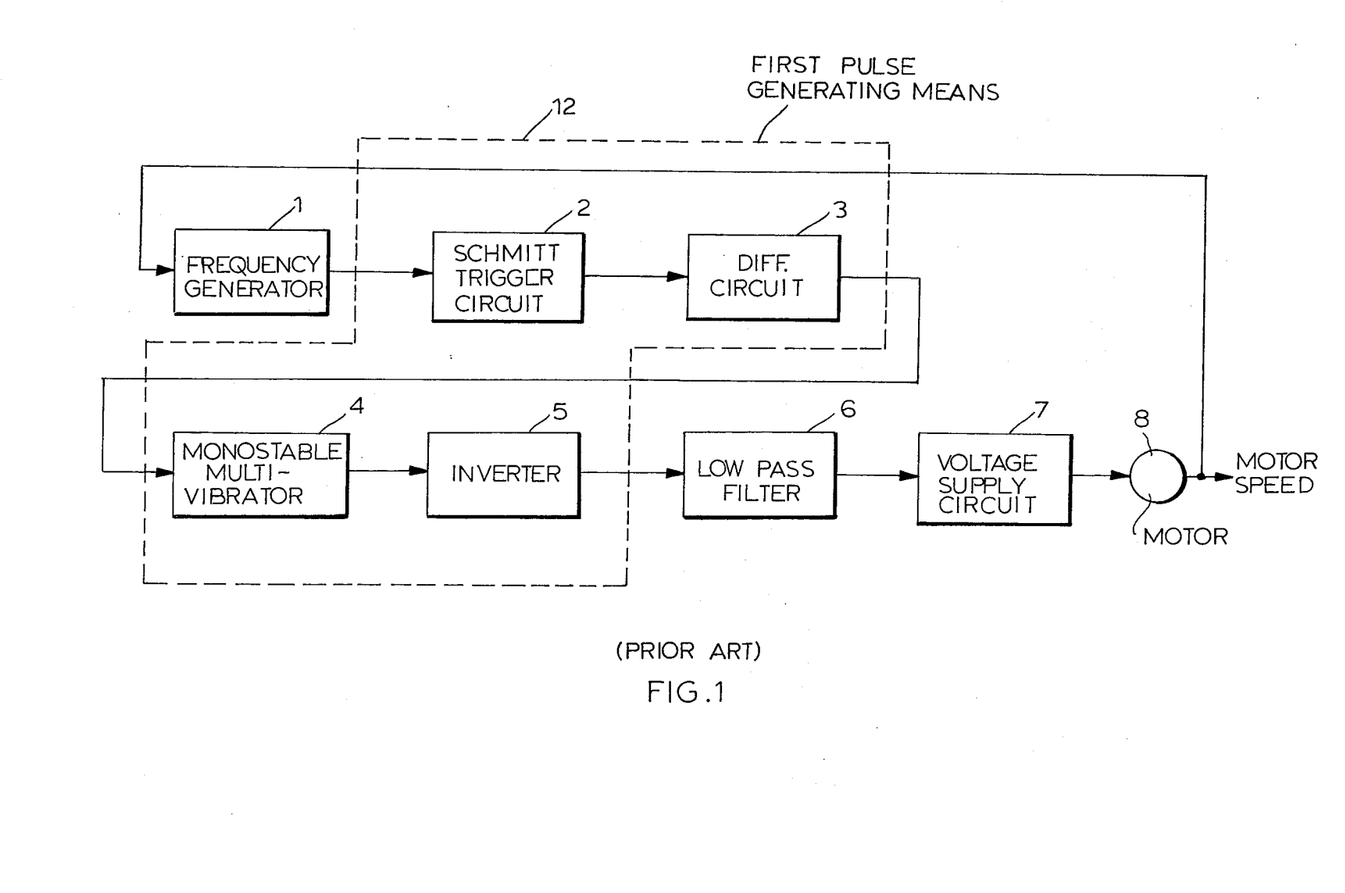
FIG. 1 is a schematic block diagram of a conventional motor speed control apparatus.
Figure 3:
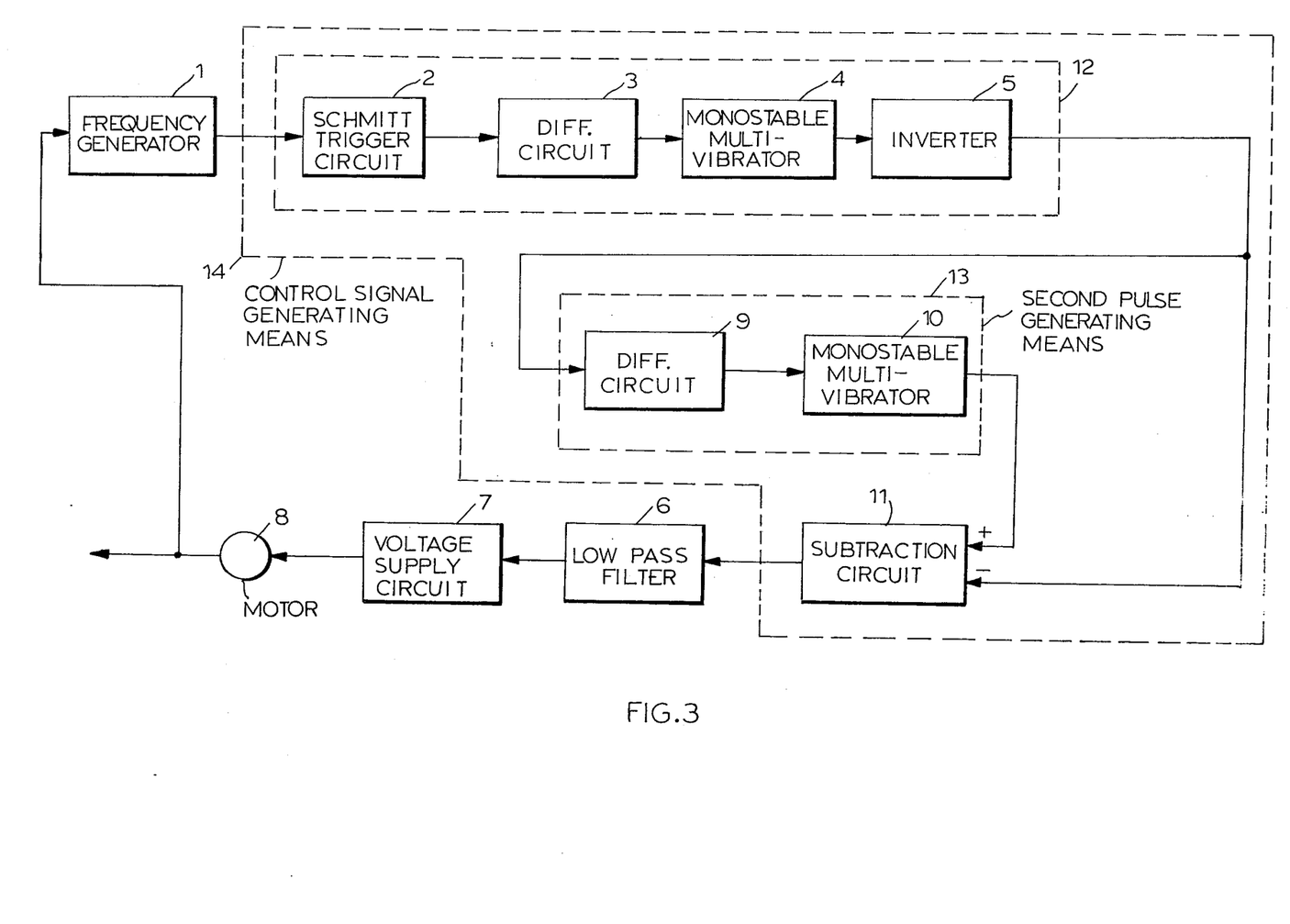
FIG. 3 is a schematic block diagram of an example of the motor speed control apparatus of this invention.
Figure 5:
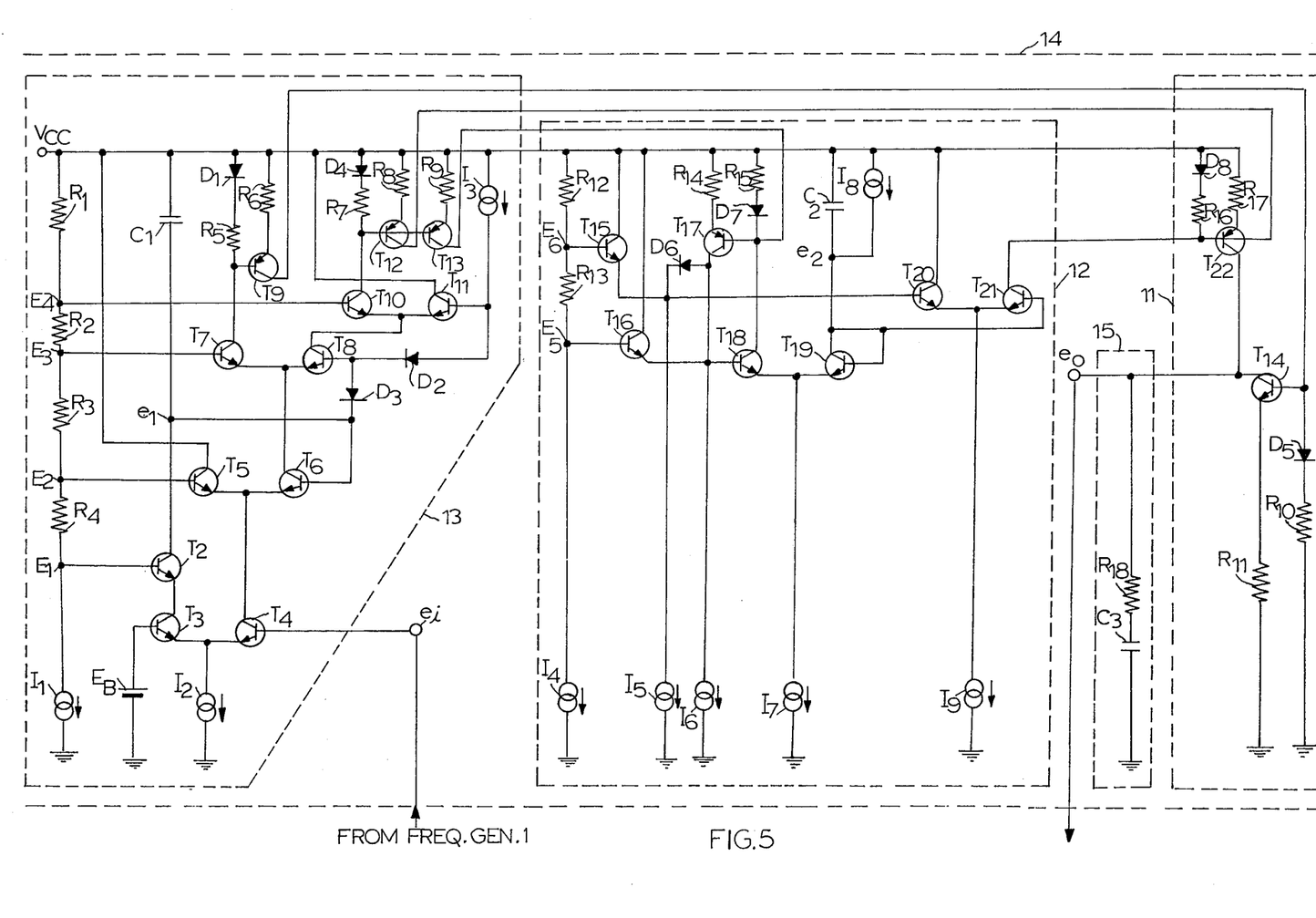
FIG. 5 is a circuit diagram of another example of the motor speed control apparatus of this invention.

Throughout FIGS. 1, 3 and 5, like elements are designated by the same reference numerals.

Figure 2:
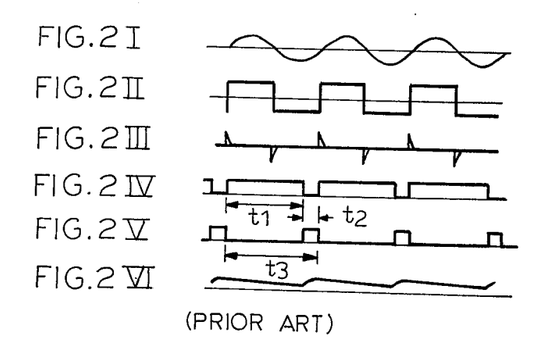

Before proceeding with the description of the apparatus of this invention, the conventional apparatus will be described below with reference to FIGS. 1 and 2.

Referring to FIG. 1, reference numeral 1 designates a frequency generating means which is coupled to a motor 8, and the output signal of the frequency generating means has a sine wave as shown by FIG. 2I and can be called a frequency signal. The period of the sine wave decreases as the motor speed increases. (The frequency of the frequency signal is proportional to the motor speed). Reference numeral 2 designates a Schmitt trigger circuit coupled to the frequency generating means for producing a rectangular wave as shown by FIG. 2II from the frequency signal. Reference numeral 3 designates a differential circuit coupled to the Schmitt trigger circuit for producing a pulse train as shown in FIG. 2III from the rectangular wave. Reference numeral 4 designates a monostable multivibrator coupled to the differential circuit for producing a one-polarity rectangular wave as shown by the FIG. 2V from the pulse train of FIG. 2III. Reference numeral 5 designates an inverter coupled to the monostable multivibrator 4 for producing a pulse train as shown in FIG. 2V from the one-polarity rectangular wave by inverting the one-polarity rectangular wave.

The pulse train of FIG. 2V corresponds to the first pulse train produced in the apparatus of this invention, and the part 12 surrounded by the dotted line in FIG. 1 corresponds to the first pulse generating means in the apparatus of this invention, as will be described later, in that the part 12 produces, in dependence on the frequency signal, a pulse train having a period the same as that of the frequency signal and each pulse of the pulse train has a pulse width which is shorter than the period of the frequency signal and which decreases as the frequency of the frequency signal increases.

The time interval $t_1$ in FIG. 2IV is a constant time determined by the monostable multivibrator 4, and the time interval $t_3$ is the period of the pulse train of FIG. 2V which coincides with the period of the frequency signal of FIG. 2I. Therefore, the time interval $t_2$ in FIG. 2IV is a time obtained by subtracting, from the period of the frequency signal, the constant time interval $t_1$ determined by the monostable multivibrator 4. This is why the pulse train of FIG. 2V is composed of pulses having a period the same as that of the frequency signal, and each pulse has a pulse width $t_2$ obtained by subtracting, from the period of the frequency signal, the constant time interval $t_1$.

Reference numeral 6 in FIG. 1 designates a low pass filter, as a smoothing circuit, coupled to the inverter 5 for smoothing the pulse train of FIG. 2V to produce a smoothed signal as shown by FIG. 2VI. The smoothed signal is applied to a motor 8 through a voltage supply circuit 7. A conventional buffer amplifier can be used as the voltage supply circuit 7.

According to this motor speed control system, the generating torque of the motor is proportional to the average voltage of the wave FIG. 2V or the average voltage plus a bias voltage. By setting $t_1 \approx t_3$ in FIGS. 2IV and 2V (i.e. setting $t_1$ to be equal to or only a little smaller than $t_3$) in the case of a normal motor speed (i.e. a desired predetermined motor speed), the signal applied to the voltage supply circuit 7 can be made to include very few ripple components, so that the motor can rotate very smoothly at the normal motor speed. However, since $t_2 \approx 0$ at the normal speed, in the case of overshooting, no electric signal is applied to the motor to recover from the overshooting for rotating the motor at the normal speed again. That is, the linearity of the speed control system is likely to be lost, and a stable motor speed control is difficult to achieve.

Overshooting can be prevented in a practical way, i.e. the linearity of the speed control system can be maintained, in such speed control system by setting the pulse width $t_2$ to be long enough so that the pulse width $t_2$ does not become zero even when the motor speed becomes very high in a probable motor speed range. However, in such case, ripple components always exist in the output signal of the smoothing circuit 6, so that undesired motor vibration occurs. If the cutoff frequency of the low pass filter used as the smoothing circuit is lowered to reduce the ripple components, the speed control system is apt to become unstable.

Figure 4:
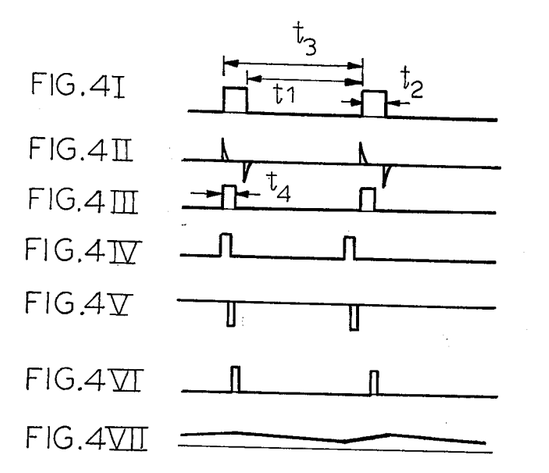

This invention has overcome these disadvantages inherent in the conventional motor speed control apparatus, and one example of the apparatus of this invention will be described hereinafter with reference to FIGS. 3 and 4.

Referring to FIG. 3, reference numerals 1 to 8 designate frequency generating means, a Schmitt trigger circuit, a differential circuit, a monostable multivibrator, an inverter, a smoothing circuit (low pass filter), a voltage supply circuit and a motor, respectively, which are similar to the elements 1 to 8 of FIG. 1 and which have functions similar to those of the elements 1 to 8 of FIG. 1. Thus, the pulse generating means 12 in FIG. 3 produces a pulse train similar to the pulse train produced by the pulse generating means 12 in FIG. 1. This pulse generating means 12 is a first pulse generating means according to the apparatus of this invention, and the first pulse generating means 12 produces, in dependence on the frequency signal, a first pulse train, as shown by FIG. 4I, which has a period the same as that of the frequency signal and each pulse of the first pulse train has a pulse width $t_2$ which is shorter than the period of the frequency signal and which decreases as the frequency of the frequency signal increases.

Reference numeral 9 designates a differential circuit coupled to the inverter 5 for producing a pulse train as shown by FIG. 4II from the first pulse train of FIG. 4I. Reference numeral 10 designates a monostable multivibrator coupled to the differential circuit 9 for producing a pulse train as shown by FIG. 4III from the pulse train of FIG. 4II. This pulse train of FIG. 4III is the second pulse train according to the this invention, and the combination of the differential circuit 9 and the monostable multivibrator 10 is second pulse generating means 13 according to the apparatus of this invention. Each pulse of the second pulse train has a leading edge coinciding in timing with the leading edge of each pulse of the first pulse train and has a pulse width $t_4$ which is a constant width independent of the frequency of the frequency generator 1 and which is the same as or nearly the same as that of each pulse of the first pulse train obtained by the motor rotation at a predetermined speed, i.e. when the motor is rotating at a desired or normal speed.

Reference numeral 11 designates substraction means coupled to the first and second pulse generating means 12 and 13 for producing a third pulse train as shown by FIG. 4VI from the first and second pulse trains by the subtraction of the first pulse train and the second pulse train, each pulse of the third pulse train thus having a pulse width corresponding to the difference between the pulse width of each pulse of the first pulse train and the pulse width of each pulse of the second pulse train. Thus, reference numeral 14 designates control signal generating means. A motor torque control signal corresponding to the third pulse train is supplied to the motor 8, thereby a desired motor speed controlling being achieved. The third pulse train is applied to a low pass filter 6, as a smoothing circuit, coupled to the subtraction means 11 for smoothing the third pulse train of FIG. 4VI to produce a smoothed signal as shown by FIG. 4VII. The smoothed signal is applied to the motor 8 through a voltage supply circuit 7.

The advantages of the apparatus of this invention are as follows. Since the pulse width of each pulse of the third pulse train can be made very short, the ripple components in the smoothed signal to be applied to the voltage supply circuit 7 can be very much minimized. Further, when the motor happens to rotate at a speed higher than the predetermined speed, the pulse width of each pulse of the first pulse train becomes shorter as shown by FIG. 4IV, so that the polarity of each pulse of the third pulse train becomes negative as shown by FIG. 4V, and thus a negative signal is applied to the voltage supply circuit. Since the negative signal acts as a brake signal to lower the motor speed, the motor speed is made to return to the predetermined speed. Thus, the linearity of the motor speed control system which inherently is lost in the conventional apparatus is retained in the apparatus of this invention.

Although the first pulse train is firstly produced and the second pulse train is secondly produced in the above example of the present invention as described with reference to FIGS. 3 and 4 (i.e. the first pulse generating means is coupled, at an input terminal thereof, to the frequency generating means, and the second pulse generating means is coupled, at an input terminal thereof, to the first pulse generating means), the order of pulse production can be reversed as long as both the first and second pulse trains are produced and applied to the subtraction means. An example of a motor speed control apparatus in which the second pulse train is firstly produced and the first pulse train is secondly produced will be described below with reference to FIGS. 5 and 6 which is another example of this invention.

Referring to FIG. 5, reference numeral 14 designates control signal generating means which produces a pulse train similar to the third pulse train as described above with reference to FIGS. 3 and 4. The control signal generating means 14 of FIG. 5 can replace the control signal generating means 14 of FIG. 3. Reference numeral 13 designates second pulse generating means which produces, from the frequency signal, a pulse train similar to the second pulse train as described above with reference to FIGS. 3 and 4. Reference numeral 12 designates first pulse generating means coupled to the second pulse generating means 13 for producing a pulse train similar to the first pulse train as described above with reference to FIGS. 3 and 4. Reference numeral 11 designates subtraction means which is an example of subtraction means used in the apparatus of FIG. 3 also and including at the same time the current source composed of the transistors $T_{14}$ and $T_{22}$, and is coupled to both the second and first pulse generating means 13 and 12 and produces a current pulse train similar to the third pulse train as described above with reference to FIGS. 3 and 4. Reference numeral 15 designates an impedance circuit coupled to the current source $T_{14}$, $T_{22}$ included in subtraction means 11 for modifying the third pulse train in order to minimize the influence of the load torque on the speed of motor in the steady state. The improved third pulse train is applied to the low pass filter 6 as a smoothing circuit in a manner similar to that in FIG. 3 and is then applied to the motor (not shown but shown in FIG. 3) through the voltage supply circuit (not shown but shown in FIG. 3) in a manner similar to that in FIG. 3.

Hereinafter details of the apparatus of FIG. 5 and function thereof will be described with reference to the parts of FIG. 6. Reference characters $I_1$ to $I_9$ designate constant D.C. current sources which produce constant D.C. currents $i_1$ to $i_9$, respectively. Reference characters $E_1$ to $E_4$ designate constant potentials determined by the current $i_1$ and resistors $R_1$ to $R_4$, respectively. Reference characters $E_5$ and $E_6$ designate constant potentials determined by the current $i_4$ and the resistors $R_{12}$ and $R_{13}$, respectively. Reference characters $D_1$ to $D_8$ designate diodes the voltages across which are $V_{D1}$ to $V_{D8}$, respectively. Reference characters $T_2$ to $T_{22}$ designate transistors the base-emitter voltages of which are $V_{BE2}$ to $V_{BE22}$, respectively. The output signal from the frequency generating means 1 with the bias $E_B$ is applied to the base of the transistor $T_4$ as an input signal which is designated as $e_i$ and its waveform is shown by FIG. 6I.

When $e_i > E_B$, the capacitor $C_1$ is charged with the constant current $i_3$ in a positive direction by the current source $I_3$, and thus the collector potential $e_1$ of the transistor $T_2$ to which the capacitor $C_1$ is coupled continues increasing until the current source $I_3$ becomes saturated, and becomes stable upon the saturation of the current source $I_3$. When $e_i < E_B$, the current $i_2$ from the current source $I_2$ flows to the transistor $T_3$. By selecting the current $i_2$ to be larger than $i_3$, the capacitor $C_1$ is charged with the current difference $i_2 - i_3$ in a negative direction, so that the potential $e_1$ continues decreasing until the transistor $T_2$ becomes saturated, and becomes stable upon the saturation of the transistor $T_2$. Therefore, the potential $e_1$ has a waveform as shown by FIG. 6II.

Further, when $e_i > E_B$, the current $i_2$ flows through the transistor $T_4$, and when $e_1 < E_2$, the current $i_2$ flows through the transistor $T_5$. When the potential $e_1$ increases so as to exceed $E_2$ ($e_1 > E_2$), the current $i_2$ flows through the transistor $T_6$. In this case, when $e_1 + V_{D3} < E_3$ that is $E_2 < e_1 < E_3 - V_{D3}$, the current $i_2$ flows through the transistor $T_7$. Therefore, there flows through the transistor $T_7$, a pulse current as shown by FIG. 6III. The period of the pulse current is the same as the period of $e_i$, i.e. $\tau_3$ as shown in FIG. 6I. That is, the period of this pulse current is the same as the period of the output signal (frequency signal) of the frequency generating means 1 of FIG. 3. Moreover, since the current $i_2$, the voltage $E_2$, the voltage difference $E_3 - V_{D3}$ and the capacitor $C_1$ value are all constant, the pulse width $\tau_4$ in FIG. 6 (iii) is constant. The pulse train of FIG. 6III corresponds to the second pulse train as defined above.

When the potential $e_1$ further increases, the current $i_2$ flows through the transistor $T_8$, and while $e_1 + V_{D2} + V_{D3} < E_4$, i.e. $E_3 - V_{D3} < e_1 < E_4 - V_{D2} - V_{D3}$, the current $i_2$ flows through the transistor $T_{10}$. Therefore, a pulse current as shown by FIG. 6IV flows through the transistor $T_{10}$. For a little time before this pulse current is produced, the transistor $T_{18}$ in the differential amplifier composed of the transistors $T_{18}$ and $T_{19}$ is in the ON state, and the collector current of the transistor $T_{18}$, i.e. $i_7$, flows through the diode $D_7$ and the resistor $R_{15}$, so that a current is then flowing also through the resistor $R_{14}$ and the transistor $T_{17}$. By designing the circuit arrangement to make the collector current of the transistor $T_{17}$ larger than the current $i_6$, a current is cause at this time to flow also through the diode $D_6$. At this time, the voltage across this diode $D_6$ and the base-emitter voltage drop of the transistor $T_{15}$ cancel each other, so that the collector potential of the transistor $T_{17}$ (i.e. the base potential of the transistor $T_{18}$) becomes substantially equal to the potential $E_6$. In this state, when a current flows through the transistor $T_{10}$, the current $i_2$ flows through the diode $D_4$ and the resistor $R_7$, and a current also flows through the resistor $R_9$ and the transistor $T_{13}$, so that no current flows through the diode $D_7$ and the resistor $R_{15}$.

Consequently, the collector potential of the transistor $T_{17}$ falls abruptly from $E_6$ to $E_5 - V_{BE16}$, because the transistor $T_{16}$ functions as an emitter follower. (The diode $D_6$ becomes reverse-biased.) Then, the base potential of the transistor $T_{19}$ becomes higher than the base potential of the transistor $T_{18}$, so that the transistor $T_{19}$ is placed in the ON state. Thus, the capacitor $C_2$ is charged in a negative direction by the current difference $i_7 - i_8$, and so the collector potential $e_2$ of the transistor $T_{19}$ which is connected to the capacitor $C_2$ starts decreasing.

When the potential $e_2$ further decreases to become substantially equal to $E_5 - V_{BE16}$, a current starts flowing also through the transistor $T_{18}$, and a positive feedback occurs, due to the provision of the diode $D_7$, the resistors $R_{15}$ and $R_{14}$, and the transistor $T_{17}$, so as to further increase the base potential of the transistor $T_{18}$, so that the conducting states of the transistors $T_{18}$ and $T_{19}$ are instantaneously switched, and the transistors $T_{18}$ and $T_{19}$ are placed in the ON and OFF states again, respectively. Thereafter, the capacitor $C_2$ is charged in a positive direction by the current $i_8$ until the voltage of $C_2$ becomes substantially equal to the potential $E_6$. And then, at the instant when the transistor $T_{10}$ is changed to the ON state, the conducting states of the transistors $T_{18}$ and $T_{19}$ are switched, so as to be in the OFF and ON states again, respectively. Therefore, the collector potential $e_2$ of the transistor $T_{19}$ has a waveform as shown by FIG. 6V, the period of which is equal to that of the frequency signal from the frequency generating means 1 of FIG. 3. The switching of the conductivity state of the transistor $T_{18}$ and $T_{19}$ occurs not only when the potential $e_2$ increases up to the last stable potential substantially equal to the potential $E_6$ but also when the potential $e_2$ is lower than the last stable potential as shown in FIG. 6V.

Since the currents $i_7$ and $i_8$, potentials $E_5$ and $E_6$, and the value of capacitor $C_2$ are all constant, and when the value of current $i_7$ is sufficiently larger than the value of current $i_8$, the time interval $\tau_1$ as shown in FIG. 6V is also almost constant. Further, in the differential amplifier composed of the transistors $T_{20}$ and $T_{21}$, the transistor $T_{21}$ is the in ON state only in the case of $e_2 < E_6 - \lambda V_{BE15}$, and while the transistor $T_{21}$ is in the ON state, the current $i_9$ from the current source $I_9$ flows through the diode $D_8$ and the resistor $R_{16}$. And because from the transistor $T_{12}$ a collector current is applied to the transistor $T_{21}$ when the current $i_2$ flows through the transistor $T_{10}$, a pulse current as shown by FIG. 6VI flows through the resistor $R_{17}$ and the transistor $T_{22}$. This pulse train of FIG. 6VI corresponds to the first pulse train as defined above. The trailing edge of each pulse of the second pulse train of FIG. 6III coincides in time with or is synchronized with that of the first pulse train of FIG. 6VI.

Accordingly, the current $i_2$ (as shown by FIG. 6III) having flowed through the transistor $T_7$ is applied to the series connection of the resistor $R_{18}$ and the capacitor $C_3$ through a current reversal circuit composed of the diode $D_1$, the resistors $R_5$ and $R_6$, the transistor $T_9$, the diode $D_5$, the resistors $R_{10}$ and $R_{11}$, and the transistor $T_{14}$. Similarly, the collector current of the transistor $T_{22}$ is applied to the series connection of the resistor $R_{18}$ and the capacitor $C_3$. By designing these circuit elements to make these two currents be equal to each other in amplitude and opposite in direction, the current as shown by FIG. 6VII consequently flows through the resistor $R_{18}$.

Figure 6:
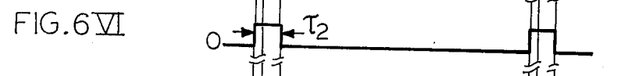

Accordingly, when the motor rotational speed is low and hence the period $\tau_3$ in FIG. 6 is long, the relation between $\tau_4$ and $\tau_2$ is $\tau_2 > \tau_4$, so that the capacitor $C_3$ is charged to increase the voltage thereacross. Therefore, the potential $e_0$ at the terminal connected to the collector of each of the transistors $T_{14}$ and $T_{22}$ increases. On the other hand, when the motor rotational speed is high and hence the period $\tau_3$ is short, the relation between $\tau_4$ and $\tau_2$ is $\tau_4 > \tau_2$, so that the capacitor $C_3$ is charged to decrease the voltage thereacross. Therefore, the potential $e_0$ decreases. Consequently, by driving the voltage supply circuit 7 of FIG. 3 by the potential $e_0$, the relation between $\tau_4$ and $\tau_2$ in FIG. 6 converges to $\tau_4 = \tau_2$ (i.e. $\tau_6 = 0$), so that the motor is controlled to rotate at a constant speed.

This constant speed control is achieved under any motor load condition due to the function of the capacitor $C_3$. That is, the voltage across the capacitor varies with the variation of the load so as to keep the condition $\tau_4 = \tau_2$. And the existance of the resistor $R_{18}$ produces stability of the control system, i.e. by selecting a suitable time constant $C_3 \cdot R_{18}$ the control system will be stable. Moreover, when the motor speed is a constant (predetermined) speed, no current flows through the resistor $R_{18}$ due to $\tau_4 = \tau_2$, so that no ripple components exist in the signal at the terminal $e_0$ of FIG. 5. Therefore, the motor rotates very smoothly.

Furthermore, since the pulse train of FIG. 6VII having a pulse width corresponding to the difference between the pulse width of FIG. 6III and the pulse width of FIG. 6VI is used to drive the motor, the linearity of the motor speed control system which inherently is lost in the conventional apparatus is retained in the apparatus of FIG. 5. For example, when the motor speed becomes so high that the pulse width $\tau_2$ of FIG. 6VI is shorter than the pulse width $\tau_4$ of FIG. 6III, a current flows through the resistor $R_{18}$ to the capacitor $C_3$ so as to decrease the voltage across the capacitor $C_3$, so that a brake signal such as shown by FIG. 6III is produced and decreases the motor speed.

Thereby, a motor speed control apparatus which causes a motor to rotate at a constant speed independently of the motor load and to rotate very smoothly is provided by this invention.

What is claimed is:

1. A motor speed control apparatus comprising: frequency generating means coupled to the motor to be controlled for generating a frequency signal, the frequency of which is proportional to the rotational speed of said motor; and control signal generating means coupled to said frequency generating means for generating a control signal for controlling the torque of said motor, said control signal generating means comprising (a) first pulse generating means for generating, in dependence on said frequency signal, a first pulse train having a period the same as that of said frequency signal, each pulse having a pulse width which is shorter than the period of said frequency signal and which decreases as the frequency of said frequency signal increases; (b) second pulse train generating means for generating in dependence on said frequency signal a second pulse train of pulses, one edge of each of which coincides in time with the corresponding edge of each pulse of said first pulse train, each pulse of said second pulse train having a constant pulse width which is in a range from the same width to nearly the same width as that of said each pulse of said firt pulse train obtained by the motor rotation at a predetermined speed; and (c) subtraction means coupled to said first and second pulse generating means for producing a third pulse train of pulses which is the difference between said first pulse train and said second pulse train, each of which has a pulse width corresponding to the difference between said pulse width of said pulses of said first pulse train and said pulse width of said pulses of said second pulse train and has a first polarity when the pulse width of said pulses of said first pulse train exceeds the pulse width of said pulses of said second pulse train and has an opposite polarity when the pulse width of said pulses of said second pulse train exceeds the pulse width of said pulses of said first pulse train, whereby a motor torque corresponding to said third pulse train can be generated when said third pulse train is supplied to said motor as the driving signal therefor.

2. A motor speed control apparatus according to claim 1, wherein said one edge of said each pulse of said second pulse train is the leading edge thereof, and said corresponding edge of said pulse of said first pulse train is the leading edge thereof.

3. A motor speed control apparatus according to claim 1, wherein said one edge of said each pulse of said second pulse train is the trailing edge thereof, and said corresponding edge of said each pulse of said first pulse train is the trailing edge thereof.

4. A motor speed control apparatus according to claim 1, wherein said first pulse generating means is coupled, at an input terminal thereof, to said frequency signal generating means, and said second pulse generating means is coupled, at an input terminal thereof, to said first pulse generating means.

5. A motor speed control apparatus according to claim 1, wherein said second pulse generating means is coupled, at an input terminal thereof, to said frequency signal generating means, and said first pulse generating means is coupled, at an input terminal thereof, to said second pulse generating means.

6. A motor speed control apparatus according to claim 1, wherein each of said first and second pulse generating means includes a monostable multivibrator.

7. A motor speed control apparatus according to claim 1 wherein said control signal generating means includes an impedance circuit constituted by a series connected capacitor and resistor, and said subtraction means includes a current source which can supply a positive and negative current to said impedance means, the voltage across said capacitor being varied with variation of the motor load for keeping said pulse width of said each pulse of said first pulse train the same as that of said second pulse train.

* * * * *